Nov. 12, 1968  H. GÖTT ETAL  3,410,319
MESH WELDING MACHINE

Filed March 20, 1967  2 Sheets-Sheet 1

INVENTORS:
Hans Gött and
Josef Ritter,

BY
THEIR ATTORNEY.

Nov. 12, 1968     H. GÖTT ETAL     3,410,319
MESH WELDING MACHINE
Filed March 20, 1967     2 Sheets-Sheet 2
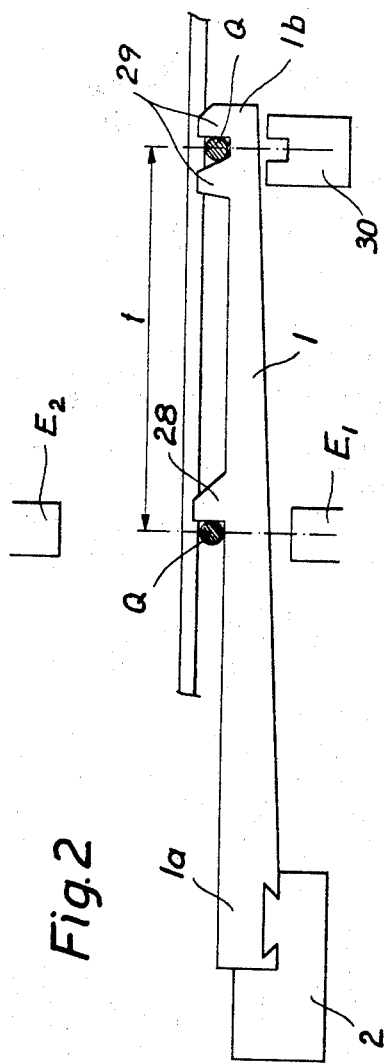
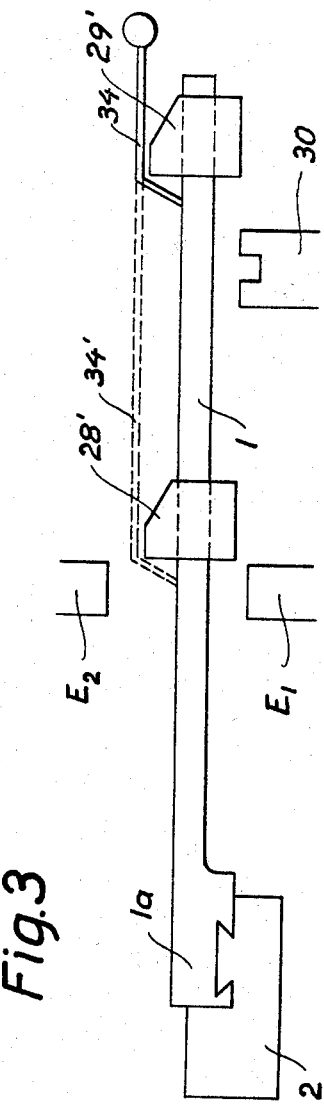
INVENTORS:
Hans Gött and
Josef Ritter,
BY *Ernst A. Marmorek,*
THEIR ATTORNEY.

United States Patent Office 3,410,319
Patented Nov. 12, 1968

3,410,319
MESH WELDING MACHINE
Hans Gött, Graz, and Josef Ritter, Graz-Kroisbach, Austria, assignors to EVG Entwicklungs- und Verwertungsgesellschaft m.b.H., Graz, Styria, Austria, a corporation of Austria
Filed Mar. 20, 1967, Ser. No. 624,312
Claims priority, application Austria, Mar. 22, 1966,
A 2,748/66
8 Claims. (Cl. 140—112)

ABSTRACT OF THE DISCLOSURE

A reciprocating mechanism for advancing welded mesh through a wire-mesh welding machine. Said mechanism receiving lateral wires from a supply means, and advancing the lateral wires along with the welded mesh sequentially to and through the welding station during the advance strokes of the reciprocation, and being moved downwards out of engagement with the wires during the return strokes.

---

In machines of one kind for the welding of wire mesh by the spot welding method, continuous longitudinal wires of the mesh are drawn from coils and passed to the welding electrodes parallel to each other at a mutual distance corresponding to the required longitudinal wire spacing of the mesh while the lateral wires are inserted into the machine from the side at a distance from the welding electrodes through a guide extending at right angles to the path of the longitudinal wires. The longitudinal wires and the inserted lateral wires are then advanced in the machine until the points of intersection of the wires are aligned with a row of electrodes distributed laterally across the width of the machine and welding is effected. It is also known in machines of this kind to insert two or more lateral wires at a time simultaneously from the side and to advance these lateral wires to two or more rows of electrodes and then to weld their points of intersection with the longitudinal wires by single or double spot welding.

In known mesh welding machines of the kind described, the advancement of the longitudinal wires is effected by drawing forward the welded mesh by means of hooks moving alternately forwards and backwards while the transport of the lateral wires from the lateral wire insertion guide to the welding electrodes is effected by conveyors such as drums and gripper fingers. This results in a relatively great expense since separate drives are required for both the advancement hooks and the lateral wire conveyors. It is also already known to effect the advancement of the longitudinal wires or mesh and the movement of the lateral wires by hook chains running over reversal rollers but this construction has the disadvantages of requiring a large amount of space and having large moving masses which limit the possible operating speed in view of the intermittent operation necessary.

The present invention is concerned with constructing a mechanism for both advancing the welded mesh through the machine and moving the lateral wires to the electrodes to obviate the disadvantages described above, i.e., with relatively little expense in space-saving construction and with relatively low moving masses so that a high operating rate and thus a high productivity is possible.

To this end, according to this invention, such a mechanism, in a machine of the kind described, includes transport rails extending in the direction of advancement of the longitudinal wires, the rails having at their front ends a common driving mechanism, which moves the rails backwards and forwards in the direction of the path of the longitudinal wires and causes, during the backward movement, at least the rear ends of the rails to move downwards out of engagement with the unwelded lateral wire or wires and then upwards again, the rails being freely pivotally connected to the driving mechanism and having means for receiving the lateral wires inserted from the guide and members which engage with at least one of the lateral wires after welding to the longitudinal wires.

Preferably, the front ends of the rails are connected together by means of a lateral beam which is driven by the driving mechanism.

If the machine is such that the electrodes may be adjusted in position at right angles to the advancement direction of the longitudinal wires, in order to change the longitudinal wire spacing, the transport rails are similarly arranged to be displaceable along the lateral beam and lockable so that the transport rails may also be set so that their vertical planes of movement lie between two adjacent electrodes.

There are various possibilities for the construction of the driving mechanism. Thus the transport rails may move purely translationally or almost translationally round a path of movement such that the front and rear ends of the transport rails describe identical or different closed paths. However it is preferred to construct the mechanism in such a way that it reciprocates the beam parallel to the plane containing the longitudinal wires and also oscillates the beam about its own longitudinal axis to move the rear ends of the rails downwards as the beam moves rearwards.

In order to be able to change the lateral wire spacing, the driving mechanism is preferably adjustable to vary the length of the stroke of the rails in their backward and forward movement.

An example of a mesh welding machine constructed in accordance with the invention and some modifications are illustrated in the accompanying drawings in which:

FIGURES 2 and 3 are diagrammatic side elevations of two alternative forms of transport rail forming part of the machine.

Figure 1:
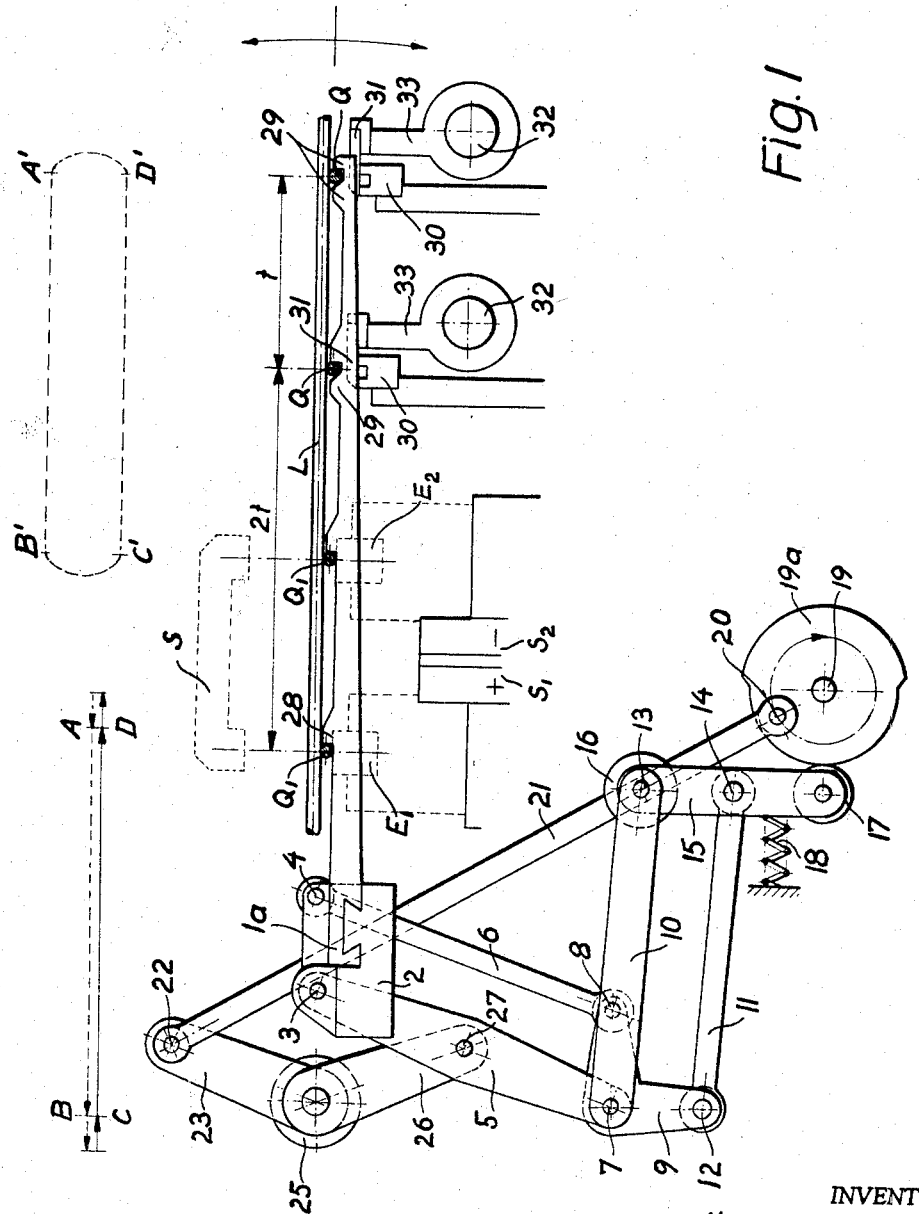
FIGURE 1 is a diagrammatic side elevation of the machine.

In FIGURE 1 the end one of a row of transport rails 1 arranged in sequence across the machine is shown. This transport rail has, at its front end 1a, a dovetail groove by means of which it is fixed to a dovetail tongue of a lateral beam 2 which runs across the width of the machine and is common to all the transport rails. Each transport rail 1 can be adjusted in position along the dovetail tongue of the beam 2 and be fixed in selected positions. On the lateral beam 2 at points 3 and 4 there are pivotally attached a double arm lever 5 and a thrust rod 6 on each side of the welding machine. The lever 5 and the thrust rod 6 are further pivotally attached at points 7 and 8 respectively to the fulcrum and an arm of a bell crank lever 9 and form a parallel motion linkage. In a similar way two rods 10 and 11, are at one end pivotally attached at 7 and 12 respectively to the fulcrum and the other arm of the bell crank lever 9 and at the other end to a shaft 13 and a point 14 on a lever 15 which is rotatable about the shaft 13. The rods 10 and 11 form another parallel motion linkage. The shaft 13 is supported in a bearing 16 and cannot be displaced; the rod 10 and the lever 15 may rotate both relatively to the shaft 13 and relatively to each other. The lever 15 at its lower end carries a cam follower roller 17 and this is pressed by a spring 18 against an operating cam 19a on a motor-driven camshaft 19.

There is a crank pin 20 on the cam 19a to which a connecting rod 21 is attached. The other end of the connecting rod 21 is attached to a pivot pin 22 which is mounted on a lever 23.

The lever 23 and a further lever 26 are fixed on a shaft 24, which is rotatably mounted in an immovable bearing 25, so that rotational movement of the lever 23 is transferred to the shaft 24 and from this to the lever 26. The other end of the lever 26 is pivotally attached to the lever 5 by means of a pivot 27. The spaces between the axes of the pivots 3 and 27 and between the axes of the pivot 27 and the shaft 24 are equal.

Each transport rail 1 carries, on the upper side facing the mesh, members for the further transport of the mesh. In this example these members are hooks 28. These hooks engage with lateral wires Q1 already welded to longitudinal wires L. In addition each transport rail 1 on its upper side has notches for lateral wires Q just inserted from the side. These notches in the example shown are formed by two pairs of projections 29 lying close together and the slot formed between each pair of projections receives and locates a lateral wire Q.

In the example shown two lateral wires inserted from the side at the same time at the mutual distance corresponding to the required lateral wire spacing $t$ are advanced by twice the amount of the lateral wire spacing so that the points of intersection of the longitudinal wires L and the advanced lateral wires Q1 come to lie above two rows of electrodes E1, E2 which are arranged across the machine and which receive the welding current from busbars S1 and S2 insulated from each other. Welding takes place using the double spot welding method using an inert current bridge S which lies on the opposite side of the mesh from the electrodes and closes the welding current circuit in a known manner through two points of intersection of wires which lie in sequence in the longitudinal wire direction and are connected electrically in series.

The insertion of the lateral wires takes place, as already mentioned, from the side in channel-type lateral wire guides 30 which are shown only diagrammatically, and which at the top are covered with flaps 31. These flaps are mounted on flap supports 33 attached to shafts 32.

The drive already described acts by giving the lateral beam 2, which controls the front ends 1a of the transport rails, a to-and-fro motion corresponding to the movement phases A–B–C–D–A shown in the motion diagram above FIGURE 1. In the backward movement, the lateral beam is tilted in such a way that the rear ends 1b of the transport rails move around the closed path A'–B'–C'–D'–A' i.e. during the backward motion there is first a descent from B' to C' and then a rise again from D' to A'. At the end of the backward movement of the transport rails 1 therefore the lateral wires Q are lifted up by the transport rails out of the channels 30 and the shafts 32, through suitable couplings with the drive (not shown), perform a limited clockwise movement together with the attached flap supports 33 so that the flaps 31 expose the tops of the lateral wire guide channels 30. During the movement phases A–B and A'–B' respectively of the transport rails the lateral wires Q picked up by the notches are advanced to the electrodes E1 and E2 and simultaneously the hook 28, which engages the lateral wires Q1 already welded to the longitudinal wires L, advances the welded mesh together with the attached continuous longitudinal wires L by the same amount. During the movement phase B–C and B'–C' respectively, the lateral and longitudinal wires remain stationary and through the placing of the current bridge S on the wire in sections lying above the electrodes E1, E2 welding takes place during the movement phase CD and C'D'. In this movement phase, the transport rails have been lowered beneath the lateral wires and only re-engage with the mesh again, in the way already described, during the movement phase D–A and D'–A'.

FIGURE 2 shows a modified transport rail which has only one notch or pair of projections 29 for a newly inserted lateral wire Q and a hook 28 for the already welded lateral wire Q1. In a machine using this rail welding takes place by single spot welding where one row of electrodes E1 lie above and the second row of electrodes E2 below the mesh.

Through a simultaneous change in the stroke length of the drive, measured in the direction of advancement of the longitudinal wires and in the relative distance between the electrodes E1, E2 and the lateral wire insertion guide 30 and the corresponding displacement of the notch 29, as well as the hook 28 on each transport rail 1, the spacing of the lateral wires can be changed.

For this purpose it is possible, for example, to make the crank radius of the pivot 20 adjustable with a spindle. To set the initial position of the transport rails 1, the connecting rod 21 is then provided with a bottle screw with two opposite threads which can change the length of the connecting rod 21.

An alternative consists of using the rotary motion of the cam 19a to drive gearing as described in Austrian specification 186,940 and to attach the connecting rod 21 to the output side of this gearing. However, the means necessary to undertake this change are well known to those skilled in the art and therefore do not require further more detailed description.

A variant is shown in FIGURE 3 in which a change in the lateral wire spacing can be made without changing the relative positions of the electrodes E1 and E2 and the lateral wire insertion device 30. With a change in the stroke length of the drive for the transport rails 1 and a corresponding movement of a projection 29' and a member 28', a modified form of projection is used in which a relative movement between the lateral wire Q and the transport rail 1 is limited only in the rearwards direction by a stop and a spring finger 34 is provided over each projection which initially retains the inserted lateral wire during the forward movement of the transport rails until it comes up against the projection 29' whereupon it is forced from under the finger 34 which is fixed in position.

As an alternative, the finger, as shown by the dotted lines 34', may be extended so that it first engages opposite the electrodes in the path of movement of the freshly inserted lateral wire Q being transported to the welding electrodes and presses the lateral wire in the welding position against the projection 29'.

Finally it should be mentioned that every transport rail 1 in connection with the adjustable members 28 may also be provided with several mutually displaceable notches 29 into which lateral wires may be introduced alternately by a corresponding movement of the lateral wire guide 30 in order to be able to change the lateral wire spacing stepwise. There are various possibilities known to those skilled in the art for varying the stroke of the drive shown in the advancement direction of the longitudinal wires. One possibility consists in that the connecting rod 21 can be made in two pieces and a control slide fitted between the two pieces.

We claim:

1. In a mesh welding machine of the kind including a transverse row of welding electrodes, means for feeding continuous longitudinal wires to said electrodes, guide means extending at right angles to the path of said longitudinal wires for guiding lateral wires, and means for inserting lateral wires from the side of the machine through said guide at a distance behind said row of electrodes, the improved mechanism for advancing the welded mesh through said machine and moving said lateral wires up to said electrodes, including transport rails extending in the direction of the path of said longitudinal wires, a common driving mechanism at the front ends of said transport rails for moving said rails backwards and forwards in the direction of the path of said longitudinal wires and causing at least the rear ends of said rails, during said backward movement, to move downwards out of engagement with said lateral wire inserted behind said electrodes and subsequently upwards again, means pivotally connecting said rails to said driving mechanism, means on said rails for receiving said lateral wires inserted from said guide and members on said rails for engagement with at least one of said lateral wires forming part of said welded mesh for advancing said welded mesh through said machine.

2. A machine as claimed in claim 1, further comprising a lateral beam, means mounting the front ends of said transport rails on said beam and means pivotally connecting said beam to said driving mechanism.

3. A machine as claimed in claim 2, wherein said means mounting said transport rails on said beam includes adjusting means and locking means whereby said rails are adjustable in position along said beam to enable the spacing of said longitudinal wires to be varied.

4. A machine as claimed in claim 2, wherein said driving mechanism includes means for reciprocating said beam parallel to the plane containing said longitudinal wires and means for oscillating said beam about its own longitudinal axis whereby said rear ends of said rails are moved downwards as said beam moves rearwards.

5. A machine as claimed in claim 1, wherein said driving mechanism includes means for adjusting said backwards and forwards movement of said rails to vary the stroke thereof.

6. A machine as claimed in claim 5, including means adjustably mounting said electrodes whereby the positions of said electrodes are adjustable in the direction of advancement of said longitudinal wires.

7. A machine as claimed in claim 1, including means adjustably mounting said guide, said means for receiving said lateral wires from said guide, and said members, whereby the positions of said guide, said means and said members are adjustable in position in the direction of advancement of said longitudinal wires.

8. A machine as claimed in claim 5, wherein said means for receiving said lateral wires inserted from said guide comprise projections extending upwardly from said transport rails, said projections forming stops for restricting rearward movement of said lateral wires relative to said rails, means adjustably mounting said projections on said rails whereby the positions of said projections are adjustable backwards and forwards on said rails and spring finger-like members extending over said projections to press an inserted lateral wire against said projections during forward movement of said rails.

References Cited

UNITED STATES PATETNS

| | | | |
|---|---|---|---|
| 1,866,382 | 7/1932 | White | 140—112 |
| 2,736,347 | 2/1956 | Kaunitz | 140—112 |

CHARLES W. LANHAM, *Primary Examiner.*

L. A. LARSON, *Assistant Examiner.*